3,294,783
CERTAIN 3- AND 5-SUBSTITUTED-4-ISOTHIA-
ZOLYLMETHYLPENICILLINS
Henry M. Holava, Jr., Syracuse, N.Y., assignor to Bristol-
Myers Company, New York, N.Y., a corporation of
Delaware
No Drawing. Filed July 8, 1964, Ser. No. 381,224
6 Claims. (Cl. 260—239.1)

This invention relates to new synthetic compounds of value as antibacterial agents, as nutritional supplements in animal feeds, as agents for the treatment of mastitis in cattle and as therapeutic agents in poultry and animals, including man, in the treatment of infectious diseases caused by Gram-positive bacteria and, more particularly, relates to novel 4-isothiazolylmethylpenicillins which bear certain substituents at the 3- and 5-positions of the isothiazole ring, and nontoxic, pharmaceutically acceptable salts thereof.

Antibacterial agents for the penicillin class have proven highly effective in the therapy of infections due to Gram-positive bacteria but nearly all such penicillins are ineffective in concentrations below 0.1 mcg./ml. It is the object of the present invention to provide novel compounds which are effective against Gram-positive bacteria at extremely low concentrations. It is a further object of the present invention to provide such penicillins which are efficiently absorbed upon oral administration to man and animals.

The objects of the present invention have been achieved by the provision, according to the present invention, of a compound selected from the group consisting of an acid of the formula

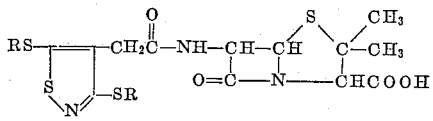

wherein R represents a member selected from the group consisting of (lower)alkyl and the substituents of the formulae

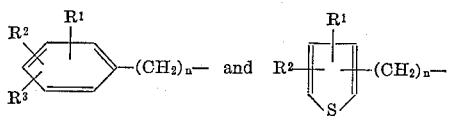

wherein $n$ is an integer from one to six inclusive and $R^1$, $R^2$ and $R^3$ each represent a member selected from the group consisting of fluoro, bromo, iodo, chloro, trifluoromethyl (lower)alkyl, (lower)alkoxy, (lower)-alkylsulfonyl and nitro; and nontoxic, pharmaceutically acceptable salts thereof.

The nontoxic, pharmaceutically acceptable salts include metallic salts such as sodium, potassium, calcium and aluminum, the ammonium salt and substituted ammonium salts, e.g. salts of such nontoxic amines as trialkylamines, including triethylamine, procaine, dibenzylamine, N-benzyl-beta-phenethylamine, 1-ephenamine, N,N'-dibenzylethylenediamine, dehydroabietylamine, N,N'-bis-dehydroabiethylethylenediamine, N-(lower)alkylpiperidines, e.g. N-ethylpiperidine, and other amines which have been used to form salts with benzylpenicillin. The term "(lower)alkyl" as used herein means both straight and branched chain aliphatic hydrocarbon radicals having from one to ten carbon atoms such as methyl, ethyl, propyl, isoproyl, butyl, isobutyl, t-butyl, amyl, hexyl, 2-ethylhexyl, heptyl, decyl, etc. Also included within the scope of the present invention are easily hydrolyzed esters and amides which are converted to the free acid form by chemical or enzymatic hydrolysis.

The preferred compounds of the present invention have the formula

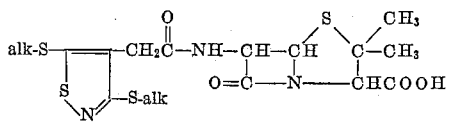

wherein alk represents (lower)alkyl.

The products of the present invention are prepared by the reaction of 6-aminopenicillanic acid, preferably in the form of a neutral salt such as the sodium salt or the triethylamine salt, with an acid chloride having the formula

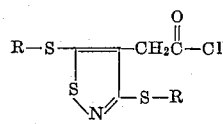

wherein R represents a member selected from the group consisting of (lower)alkyl and the substituents of the formulae

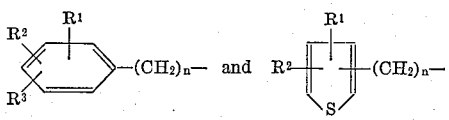

wherein $n$ is an integer from one to six inclusive and $R^1$, $R^2$ and $R^3$ each represent a member selected from the group consisting of fluoro, bromo, iodo, chloro, trifluoromethyl (lower)alkyl, (lower)alkoxy, (lower)alkylsulfonyl and nitro, or its functional equivalent as an acylating agent for a primary amino group. Such equivalents include the corresponding carboxylic acid bromides, acid anhydrides and mixed anhydrides with other carboxylic acids, including monoesters, and particularly lower aliphatic esters, of carbonic acid. In addition, an acid azide or an active ester or thioester (e.g. with p-nitrophenol, thiophenol, thioacetic acid) may be used or the free acid itself may be coupled with 6-aminopenicillanic acid by the use of enzymes or of a carbodiimide reagent, [cf. Sheehan and Hess, J. Amer. Chem. Soc., 77, 1067, (1955)]. Another equivalent of the acid chloride is a corresponding azolide, i.e. an amide of the corresponding acid whose amide nitrogen is a member of a quasi-aromatic five-membered ring containing at least two nitrogen atoms, i.e. imidazole, pyrazole, the triazoles, benzimidazole, benzotriazole and their substituted derivatives. As an example of the general method for the preparation of an azolide, N,N'-carbonyldiimidazole is reacted with a carboxylic acid in equimolar proportions at room temperature in tetrahydrofuran, chloroform, dimethylformamide or a similar inert solvent to form the carboxylic acid imidazolide in practically quantitative yield with liberation of carbon dioxide and one mole of imidazole. Dicarboxylic acids yield diimidazolides. The byproduct, imidazole, precipitates and may be separated and the imidazolide isolated but this is not essential. The methods for carrying out these reactions to produce a penicillin and the methods used to isolate the penicillins so-produced are well-known in the art.

The 3,5-(bis-substituted-thio)-isothiazole-4-acetic acids used to produce the compounds of the present invention are prepared as exemplified below from the corresponding 3,5-(bis-substituted-thio)-isothiazole-4-carboxylic acids by successive reaction with thionyl chloride, diazomethane and silver oxide; see also Organic Reactions, Volume 1, Chapter 2, The Arndt-Eistert Synthesis, pages 38–62, John Wiley and Sons, Inc., New York, N.Y., 1942 and references cited therein.

3

The necessary 3,5-(bis-substituted-thio)-isothiazole-4-carboxylic acids are prepared according to W. R. Hatchard, J. Org. Chem., 29, 660–668 (March 1964) and references given t herein.

The following examples will serve to illustrate this invention without limiting it thereto. All melting points are uncorrected and all temperatures are given in degrees centigrade.

EXAMPLE 1

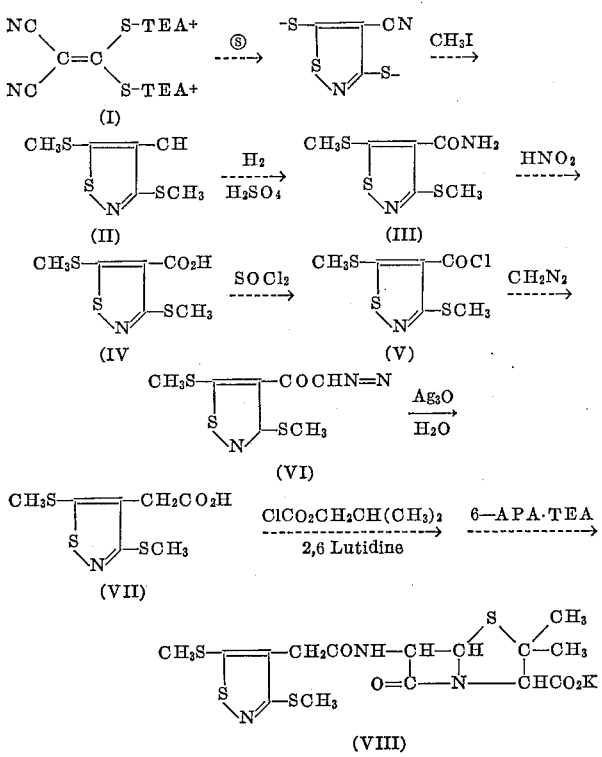

Synthesis of potassium 6-[3,5-bis-(methylthio)isothiazole-4-acetamido]penicillanate (A) Bis(triethylammoniothio)methylenemalononitrile (I).—To a solution of of 33 g. (0.5 mole) of malononitrile and 38 g. (0.5 mole) of carbon disulfide in 100 ml. of acetonitrile was added 101 g. (1.0 mole) of triethylamine (TEA) over a period of 30 minutes. The solution was stirred for 30 minutes at 20–25° and then diluted with 500 ml. of anhydrous ether. The crystalline material which separated was collected by filtration, washed with anhydrous ether and air dried. Recrystallization from acetone afforded a yield of 163 g. (99.4%) of yellow needles, M.P. 86–89°.

(B) 3,5 - bis(methylthio)isothiazole - 4-carbonitrile (II).—To a solution of 68.8 g. (0.2 mole) of I in 1000 ml. of methyl alcohol was added 6.4 g. (0.2 mole) of sulfur and the mixture was refluxed 30 minutes. After cooling to room temperature, 156.1 g. (1.1 mole) of methyl iodide was added and the mixture allowed to stand at 20–25° for two hours and then diluted with 1500 ml. of water to give 32.6 g. (80%) of white needles, M.P. 123–128°.

(C) 3,5 - bis(methylthio)isothiazole - 4-carboxamide (III).—A solution of 52.9 g. (0.26 mole) of II in 140 ml. of concentrated sulfuric acid was warmed at 60–70° for four hours and then poured into 2000 ml. of ice-water mixture. The white precipitate which formed was collected on a filter, washed with water and air-dried for 64 hours. The yield was 53.8 g. (94%) of solid, M.P. 208–210°.

(D) 3,5 - bis(methylthio)isothiazole - 4 - carboxylic acid (IV).—To a solution of 8.8 g. (0.04 mole) of III in 160 ml. of concentrated sulfuric acid and 40 ml. of water cooled to 0–5° was added dropwise with stirring a solution of 4.1 g. (0.06 mole) of sodium nitrite in 15 ml. of water over a period of 30 minutes. After addition was complete the reaction mixture was heated on a steam bath for 30 minutes, cooled and poured into 1000 ml. of ice-water mixture. The white solid that formed was collected by filtration, washed with water, redissolved in 200 ml. of 2.5% aqueous sodium carbonate, filtered, and extracted with 100 ml. of ethyl acetate. The aqueous solution was then layered with ethyl acetate, acidified to pH 3 with 1 N HCl and extracted three times with 600 ml. portions of ethyl acetate. The combined ethyl acetate extracts were washed with water, dried over anhydrous sodium sulfate, filtered and evaporated to dryness. There was obtained in this manner 6.0 g. (68%) of white solid, M.P. 240–242°.

(E) 3,5 - bis(methylthio)isothiazole - 4 - acetic acid (VII).—A benzene solution of acid chloride V, prepared by refluxing 9.3 g. (0.042 mole) of IV in excess thionyl chloride and evaporating to dryness, was added slowly at 0.5° to a solution of diazomethane prepared from 20 g. of nitrosomethylurea in benzene. After standing 19 hours at 20–25°, the excess diazomethane and benzene were removed under reduced pressure leaving a residue of diazoketone VI.

A solution of the diazoketone in 75 ml. of dioxane was added dropwise with stirring to a mixture of 1.0 g. (0.0046 mole) of silver oxide, 2.8 g. (0.026 mole) of anhydrous sodium carbonate, and 2.8 g. (0.01 mole) of sodium thiosulfate in 45 ml. of water at 60–70°. After addition was complete, stirring was continued for two hours at 60–70° and the temperature of the mixture was raised finally to 90–100°. The solution was cooled, diluted with 150 ml. of 2.5% sodium carbonate, filtered, extracted with ethyl acetate and acidified with 1 N HCl to pH 3. The precipitate which formed was filtered, washed with water and dried in a desiccator.

The crude material was redissolved in sodium carbonate solution, decolorized with carbon, filtered, extracted with ethyl acetate, acidified, collected on a filter, washed with water and dried in vacuum. Yield was 1.8 g. (18.2%) of solid, M.P. 140–142°.

(F) Potassium 6-[3,5-bis(methylthio)isothiazole-4-acetamido]-penicillanate (VIII).—To a solution of 1.0 g. (0.0042 mole) of VII and 0.45 g. (0.0042 mole) of 2,6-lutidine in 30 ml. of dimethylformamide at −5° was added 0.57 g. (0.0042 mole) of isobutyl chloroformate and the solution stirred for one hour at −5°. To the mixed anhydride solution was added a solution of 1.3 g. (0.0042 mole) of 6-aminopenicillanic acid (6–APA) triethylamine salt in 10 ml. of dimethylformamide over a period of 15 minutes and the reaction mixture stirred for 1½ hours at −5°, then at room temperature for ten minutes. The reaction mixture was diluted with 100 ml. of 2.5% aqueous sodium bicarbonate and extracted twice with 100 ml. portions of ether. The aqueous solution was then acidified to pH 2 with 1 N HCl and extracted twice with 100 ml. portions of ethyl acetate. The combined ethyl acetate extracts were washed with 100 ml. of water, dried over anhydrous sodium sulfate and filtered. On addition of 0.8 g. of a 50% solution of potassium 2-ethylhexanoate in ether and addition of a large amount of anhydrous ether, a white precipitate formed which was filtered, washed with anhydrous ether and dried immediately under vacuum. The yield obtained was 0.93 g. (47%) of white solid.

Analysis.—Calc'd. for $C_{15}H_{18}N_3O_4S_4K$: C, 38.20; H, 3.85; N, 8.93. Found: C, 35.50; H, 4.33; N, 8.51.

This compound exhibited minimum inhibitory concentrations in vitro versus Staph. aureus Smith of 0.016–0.031 mcg./ml., versus D. pneumoniae of 0.008 mcg./ml. and versus Str. pyogenes Digonnet 7 of 0.004 mcg./ml. and was found to exhibit by intramuscular injection in mice a $CD_{50}$ of 1.8 mgm./kg. versus Staph. aureus Smith.

EXAMPLE 2

Substitution for the methyl iodide of Step B, Example 1 of an equimolar weight of n-hexyl iodide, benzyl bromide and β-phenethyl iodide, respectively, produces at the end of Step F potassium 6-[3,5-(bis-n-hexylthio)-isothiazole-4-acetamido]penicillanate,
potassium 6-[3,5-(bis-n-benzylthio)-isothiazole-4-acetamido]penicillanate, and
potassium 6-[3,5-(bis-β-phenethylthio)-isothiazole-4-acetamido]-penicillanate, respectively.

I claim:
1. A compound selected from the group consisting of an acid of the formula

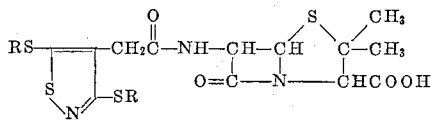

wherein R represents a member selected from the group consisting of (lower)alkyl and the substituents of the formulae

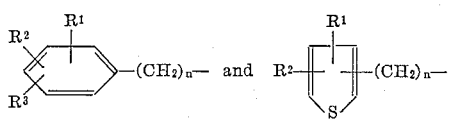

wherein $n$ is an integer from one to six inclusive and $R^1$, $R^2$ and $R^3$ each represent a member selected from the group consisting of fluoro, bromo, iodo, chloro, trifluoromethyl (lower)alkyl, (lower)alkoxy, (lower)alkylsulfonyl and nitro; and nontoxic, pharmaceutically acceptable salts thereof.

2. A compound of the formula

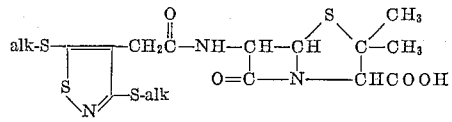

wherein "alk" represents (lower)alkyl.

3. 6-[3,5-bis(methylthio)isothiazole - 4 - acetamido] penicillanic acid.
4. 6-[3,5-(bis-n-hexylthio)isothiazole - 4 - acetamido] penicillanic acid.
5. 6-[3,5-(bis-benzylthio)isothiazole - 4 - acetamido] penicillanic acid.
6. 6-[3,5-(bis-β-phenethylthio)isothiazole - 4 - acetamido]penicillanic acid.

References Cited by the Examiner
UNITED STATES PATENTS

| | | | |
|---|---|---|---|
| 2,985,648 | 5/1961 | Doyle | 260—239.1 |
| 3,159,617 | 12/1964 | Sheehan | 260—239.1 |

NICHOLAS S. RIZZO, *Primary Examiner.*

HENRY R. JILES, *Examiner.*

J. W. ADAMS, JR., *Assistant Examiner.*